(12) United States Patent
Domingues et al.

(10) Patent No.: US 12,143,042 B2
(45) Date of Patent: Nov. 12, 2024

(54) ELECTRICALLY-EXCITED ELECTRIC MOTOR

(71) Applicant: BorgWarner Inc., Auburn Hills, MI (US)

(72) Inventors: Gabriel Domingues, Lund (SE); Tausif Husain, Dacca (BD)

(73) Assignee: BorgWarner Inc., Auburn Hills, MI (US)

( * ) Notice: Subject to any disclaimer, the term of this patent is extended or adjusted under 35 U.S.C. 154(b) by 531 days.

(21) Appl. No.: 17/388,282

(22) Filed: Jul. 29, 2021

(65) Prior Publication Data

US 2023/0030214 A1 Feb. 2, 2023

(51) Int. Cl.
*H02P 27/06* (2006.01)
*B60L 15/20* (2006.01)

(52) U.S. Cl.
CPC .............. *H02P 27/06* (2013.01); *B60L 15/20* (2013.01)

(58) Field of Classification Search
CPC .. H02P 27/06; H02P 2207/05; H02P 2207/07; H02P 9/302; B60L 15/20
See application file for complete search history.

(56) References Cited

U.S. PATENT DOCUMENTS

| 7,034,499 B2 * | 4/2006 | Kerlin, IV | H02P 25/16 318/749 |
| 8,487,566 B2 * | 7/2013 | Crane | H02P 8/00 318/400.26 |
| 9,789,776 B2 * | 10/2017 | Lee | B60L 15/007 |
| 2005/0073281 A1 * | 4/2005 | Kerlin, IV | H02P 25/16 318/749 |
| 2019/0013759 A1 * | 1/2019 | Bailey | B63H 21/14 |

FOREIGN PATENT DOCUMENTS

| JP | 2017130987 A | * | 7/2017 | |
| WO | WO-2011061233 A2 | * | 5/2011 | F03D 7/0224 |

* cited by examiner

*Primary Examiner* — Thai T Dinh
(74) *Attorney, Agent, or Firm* — Reising Ethington P.C.

(57) ABSTRACT

An electrical system configured to control an electrically-excited electric motor, including: an inverter configured to supply alternating current (AC) electrical power to the electrically-excited electric motor; the electrically-excited electric motor, including: a rotor having a rotor winding; and a stator having a stator winding; the stator winding is electrically connected to the inverter and the rotor winding is electrically connected to the inverter such that the stator winding receives an electrical current from the inverter and supplies a direct current (DC) component to the rotor.

7 Claims, 2 Drawing Sheets

ELECTRICALLY-EXCITED ELECTRIC MOTOR

TECHNICAL FIELD

The present application relates to electric motors and, more particularly, to electrically-excited electric motors.

BACKGROUND

Electric motors have a large number of different configurations. Some electric motors can be implemented as permanent magnet motors. However, while efficient, these types of electric motors can be relatively expensive relative to other designs. Electrically-excited electric motors are a type of electric motor in which the rotor receives an electrical current. However, the delivery of electrical current to the rotor can involve an increased number of components making the implementation relatively complex.

SUMMARY

In one implementation, a electrical system configured to control an electrically-excited electric motor, including: an inverter configured to supply alternating current (AC) electrical power to the electrically-excited electric motor; the electrically-excited electric motor, including: a rotor having a rotor winding; and a stator having a stator winding; the stator winding is electrically connected to the inverter and the rotor winding is electrically connected to the inverter such that the stator winding receives an electrical current from the inverter and supplies a direct current (DC) component to the rotor.

In one implementation, an electrical system configured to control an electrically-excited electric motor includes an inverter configured to supply AC electrical power to the electrically-excited electric motor; the electrically-excited electric motor including: a rotor having a rotor winding; and a stator having a first set of stator windings and a second set of stator windings, wired in parallel; the stator winding is electrically connected to the inverter and the rotor winding is electrically connected to the inverter such that the stator winding receives AC electrical current from the inverter and supplies DC electrical current to the rotor.

DETAILED DESCRIPTION

An electrically-excited electric motor can receive alternating current (AC) electrical current from an inverter at the stator and communicate a direct current (DC) electrical current to the rotor. Electrically-excited electric motors can be used in a variety of different applications. In one of those applications, electric vehicles (EVs) can use one or more electrically-excited electric motors to propel the EV. The EVs and the electrically-excited electric motor(s) used in the vehicles can be implemented in a variety of ways. For example, the electrically-excited electric motor(s) can be implemented as traction motors having a stator and a rotor with stator windings and rotor windings, respectively. The electrically-excited electric motors can receive AC electrical power originally supplied by a vehicle battery as DC electrical power that has been inverted for use by the motor(s). The stator of the electrically-excited electric motor(s) can receive the AC electrical power, from an inverter, that is used to produce torque on the rotor. In past electrically-excited electric motors, a DC-DC voltage converter would supply DC electrical current to the rotor. In such a configuration, the electrically-excited electric motor would receive electrical power from both an inverter and a DC/DC converter. It would be helpful to configure an electrically-excited electric motor in a way that it receives electrical power from the inverter both at the stator and the rotor, without receiving electrical power from the DC/DC converter.

In contrast to past EVs, the implementations disclosed herein can supply electrical power from the inverter to both the stator and the rotor. Rather than receiving DC electrical power at the rotor from the DC/DC converter and AC electrical power at the stator from the inverter, the electric motor used in an EV can receive AC electrical power from the inverter at the stator and the rotor. This configuration can help simplify EV architecture.

Figure 1:
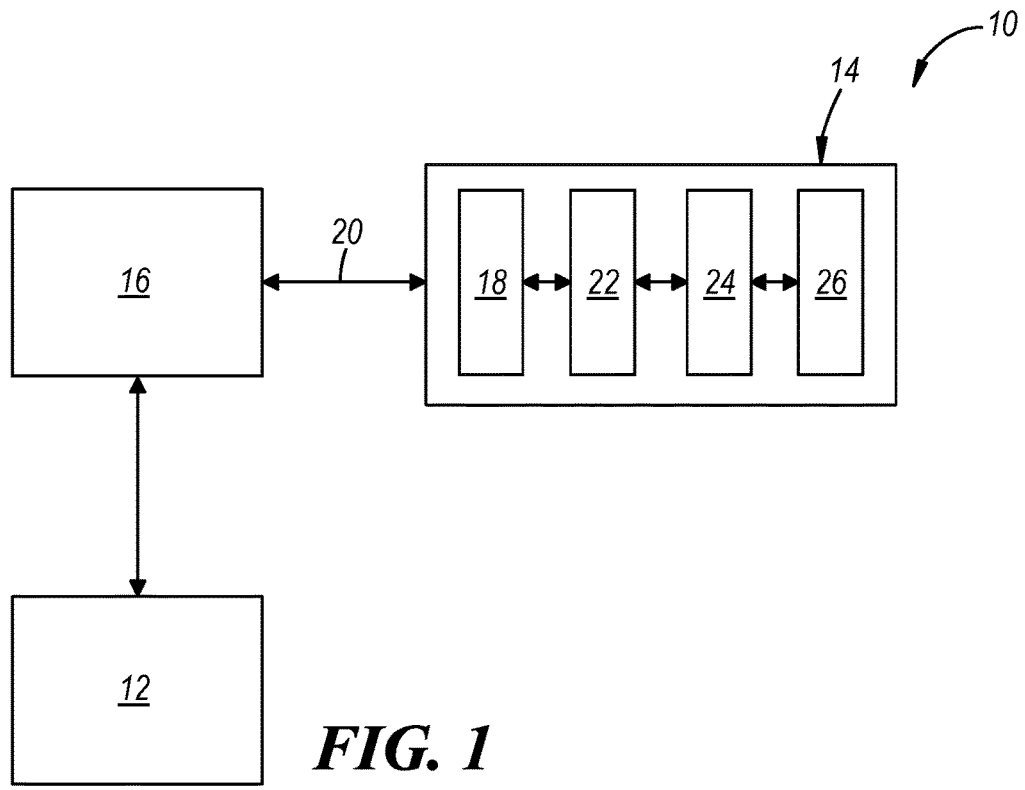
FIG. 1 is a block diagram depicting an implementation of an electrical system.

Turning to FIG. 1, an implementation of an electrical system 10 is shown including an electrical grid 12 and an electric vehicle (EV) 14 that uses an electrically-excited electric motor and can receive electrical power from the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can transmit the AC electrical power through the grid 12 to an end user, such as a residence or business. As the AC electrical power is provided via the electrical grid 12, the electrical power can exist at a relatively high voltage so that it can be communicated relatively long distances. Once the electrical power reaches a location where it is intended to be used, electrical transformers (not shown) can reduce the voltage level before ultimately providing the power to a residence or business. In one implementation, the voltage level of AC electrical power received by the residence or business is 240 volts (V). However, this voltage can be a different value.

EV service equipment 16, also referred to as an electric-vehicle-charging station, can provide the electrical power to the EV 14. The charging station 16 can be geographically fixed, such as a charging station located in a vehicle garage or in a vehicle parking lot. The charging station 16 can include an input terminal that receives the AC electrical power from the grid 12 and communicates electrical power to an on-board vehicle battery charger 18 included on the EV 14. The AC electrical power can be converted to DC electrical power at the EV service equipment 16 using an AC/DC converter before it is supplied to the EV 14. An electrical cable 20 can detachably connect with an electrical receptacle on the EV 14 and electrically link the charging station 16 with the EV 14 so that AC electrical power can be communicated between the charging station 16 and the EV 14. In one implementation, the charging station 16 can be classified as "Level 2" EV service equipment that receives 240 VAC from the grid 12 and supplies 240 VAC to the EV 14. One implementation of the charging station 16 is a Siemens VersiCharge™ Residential EV Charging Solution. It is possible the level of AC electrical power input to a charging station and/or the level of AC electrical power output from a charging station is different in other implementations. It also should be understood that the term "EV" can refer to vehicles that are propelled, either wholly or partially, by electric motors. EV can refer to electric vehicles, plug-in electric vehicles, hybrid-electric vehicles, and battery-powered vehicles. The vehicle battery 22 can supply stored DC electrical power to the electric motors that propel the EV. The vehicle battery 22 or batteries are rechargeable and can include lead-acid batteries, nickel cadmium (NiCd), nickel metal hydride, lithium-ion, and lithium polymer batteries. A typical range of vehicle battery voltages can range from 200 to 800 volts of DC electrical power (V).

Figure 2:
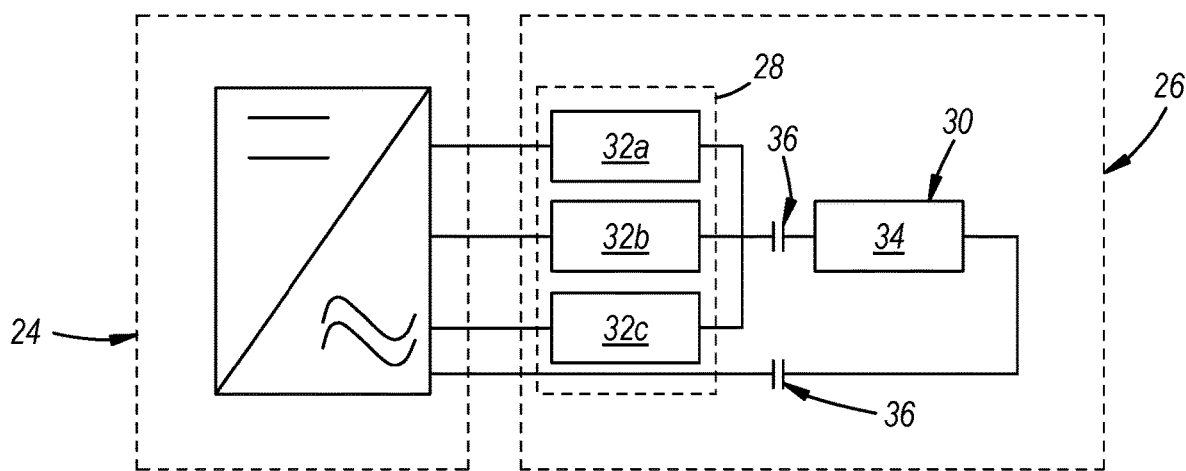
FIG. 2 is a block diagram depicting an implementation of an inverter and an electric motor.

The EV 14 may also include an inverter 24 that can convert DC electrical power stored in the vehicle battery 22 to AC electrical power and supply it to an electrically-excited electric motor 26 powering the EV 14, as is shown in FIG. 2 in more detail. The inverter 24 can be a traction inverter that converts DC power supplied from the vehicle battery 22 to AC electrical power, which induces the rotor of the electrically-excited electric motor 26 to rotate relative to the stator. The inverter 24 can be capable of receiving voltage levels from the vehicle battery 22 ranging from 200-800V and transmitting power ranging from 20 kW to 500 kW or more. In one implementation, the inverter 24 is a two-level three-phase voltage source converter receiving DC voltage from the vehicle battery 22. An example of this type of power electronics is an 800V silicon carbide inverter manufactured by BorgWarner.

The electrically-excited electric motor 26 can be a traction motor that operates using AC electrical power supplied by the inverter 24. The term electrically-excited electric motor can also be interpreted to mean a wound-rotor synchronous machine, an electrically-excited machine, or an electrically-excited synchronous machine. In one implementation, the electrically-excited electric motor 26 can be a three-phase AC traction motor having a stator 28 and a rotor 30, shown in FIG. 2. However, it should be appreciated that electrically-excited electric motors can be implemented having a different number of phases, such as six-phase. The stator 28 can include a plurality of stator teeth and slots with field or stator windings 32 wound around the teeth in one of a variety of ways such that the windings fill the rotor slots. For example, the stator 28 can be wound using cascading or hairpin copper windings. In this implementation, the stator 28 receives a first stator winding 32a, a second stator winding 32b, and a third stator winding 32c. The stator windings 32 are connected to three-phase AC electrical power output by the inverter 24. The rotor 30 includes a rotor winding 34 that is electrically connected to the stator windings 32 and also electrically connected to a negative rail of the inverter 24 via slip rings 36. Rather than use a permanent magnet (PM) rotor, the rotor winding 34 permits demagnetization of the rotor and also can be less expensive to manufacture. Unlike past designs that electrically connect the rotor winding to a DC-DC converter, the present implementation includes the inverter 24 that supplies AC electrical power to both the stator windings 32 and the rotor winding 34. The AC electrical power ultimately supplied by the inverter 24 can include a reference signal ($V_{ref}$) as a DC current offset from the AC electrical power. The AC voltage at a node (N) can be zero while the DC current remains, which is electrically communicated to the rotor winding 34 via the slip rings 36. The DC current supplied to the rotor winding 34 can be communicated through the stator 28.

Figure 3:
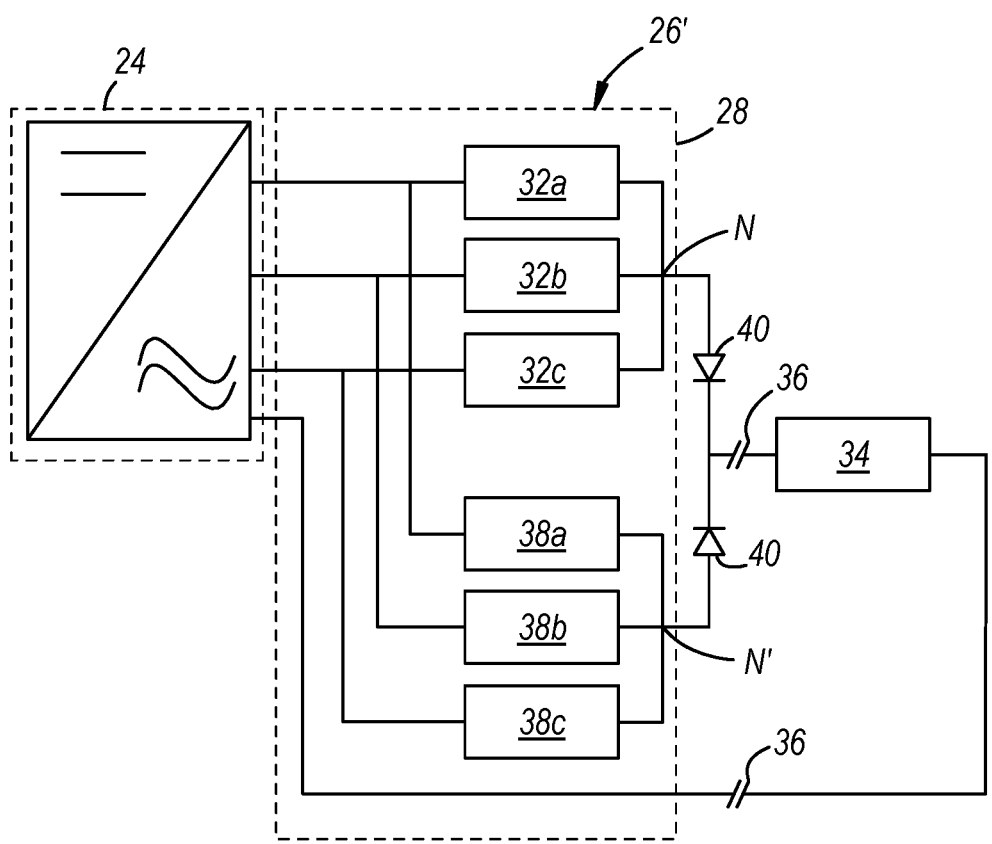
FIG. 3 is a block diagram depicting another implementation of an inverter and an electric motor.

Turning to FIG. 3, another implementation of an electrically-excited electric motor 26' is shown. The electric motor 26' includes stator windings 32 and a second set of stator windings 38 that are wired in parallel. Diodes 40 can be electrically connected to the slip rings 36 as well as the stator windings 32 and the second set of stator windings 38. The AC voltage at node N and node N' is equal.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrical system configured to control an electrically-excited electric motor, comprising:
   an inverter configured to supply alternating current (AC) electrical power to the electrically-excited electric motor;
   the electrically-excited electric motor, comprising:
     a rotor having a rotor winding; and
     a stator having a stator winding;
   wherein, the stator winding is electrically connected to the inverter and the rotor winding is electrically connected to the inverter such that the stator winding receives an electrical current from the inverter and the inverter supplies direct current (DC) electrical current to the rotor winding.

2. The electrical system recited in claim 1, wherein the DC electrical current is supplied to the rotor through the stator.

3. The electrical system recited in claim 1, wherein the electrically-excited electric motor is a traction motor.

4. The electrical system recited in claim 1, wherein the electrically-excited electric motor is a three-phase machine.

5. The electrical system recited in claim 1, wherein the electrically-excited electric motor is installed on a vehicle.

6. The electrical system recited in claim 5, further comprising a vehicle battery that is electrically connected to the electrically-excited electric motor.

7. The electrical system recited in claim 1, further comprising slip rings that electrically connect the inverter to the stator winding and the rotor winding.

* * * * *